United States Patent
Gupta et al.

(10) Patent No.: US 12,517,911 B1
(45) Date of Patent: Jan. 6, 2026

(54) UNDERSTANDING COMPLEX JOINS BY LEVERAGING JOIN DATA IDENTIFIERS

(71) Applicant: Dell Products L.P., Round Rock, TX (US)

(72) Inventors: Srishti Gupta, Rohini (IN); Saurabh Jha, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/948,823

(22) Filed: Nov. 15, 2024

(51) Int. Cl.
*G06F 16/00* (2019.01)
*G06F 16/2455* (2019.01)
*G06F 16/28* (2019.01)

(52) U.S. Cl.
CPC ........ *G06F 16/2456* (2019.01); *G06F 16/285* (2019.01)

(58) Field of Classification Search
None
See application file for complete search history.

(56) References Cited

U.S. PATENT DOCUMENTS

| | | | |
|---|---|---|---|
| 2016/0055205 A1* | 2/2016 | Jonathan | G06F 16/2456 707/714 |
| 2018/0173763 A1* | 6/2018 | Xia | G06F 16/9038 |
| 2020/0394542 A1* | 12/2020 | Buesser | G06F 18/29 |
| 2021/0365455 A1* | 11/2021 | Zhang | G06F 16/2282 |
| 2025/0200048 A1* | 6/2025 | Rindal | H04L 9/0894 |

* cited by examiner

*Primary Examiner* — Anhtai V Tran
(74) *Attorney, Agent, or Firm* — Chamberlain, Hrdlicka, White, Williams & Aughtry; Aly Z. Dossa

(57) ABSTRACT

A method for managing data includes: receiving a request from a user; obtaining a set of tables; analyzing each variable of each table of the set of tables; classifying, based on the analyzing, each variable's data type; identifying, using a first model and dynamic partitioning, a set of columns that is similar based on each variable's data type and a metric; generating, based on a second set of tables comprising the set of columns, a join data graph to model join relationships among the second set of tables; analyzing, using a second model, the graph to identify a set of candidate paths based on each path's score; determining, based on the set of candidate paths and request, a third set of tables and joinable columns associated with the third set of tables; and initiating display of the joinable columns and the third set of tables to the user.

20 Claims, 5 Drawing Sheets

| TABLE 1 | TABLE 2 | COLUMN 1 | COLUMN 2 |
|---|---|---|---|
| Historical_STDev | Biz_Rep_Payout | scp_prev | scp_prev_eoc_qbr |
| Historical_STDev | Biz_Rep_Payout | scp_n_prev | scp_prev_eoc_N |
| Corp_calendar | Mappings_SS | Snapshot_date | Week_start_date |
| Corp_calendar | Mappings_SS | Snapshot_date | Record_update_DTS |

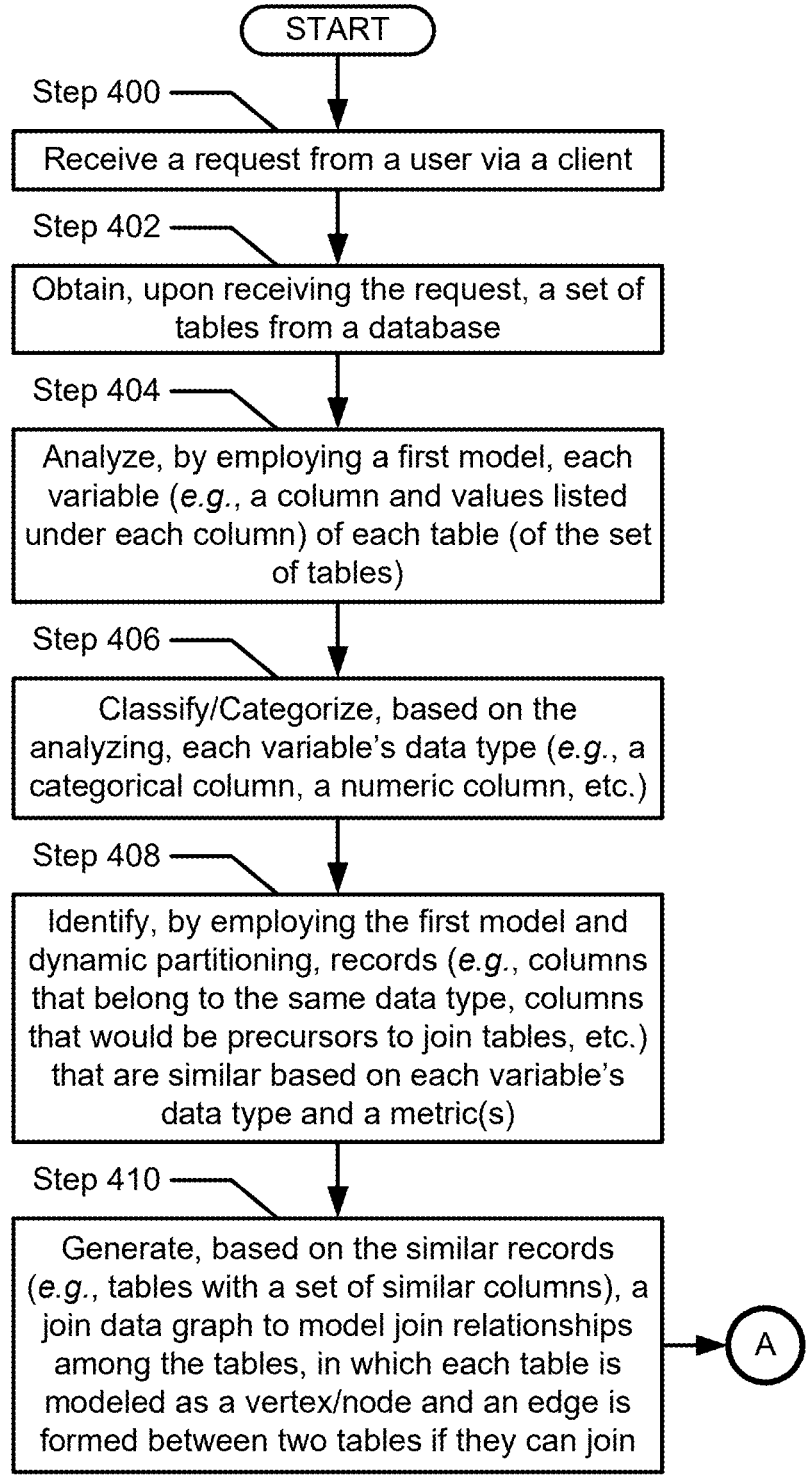
FIG. 4.1

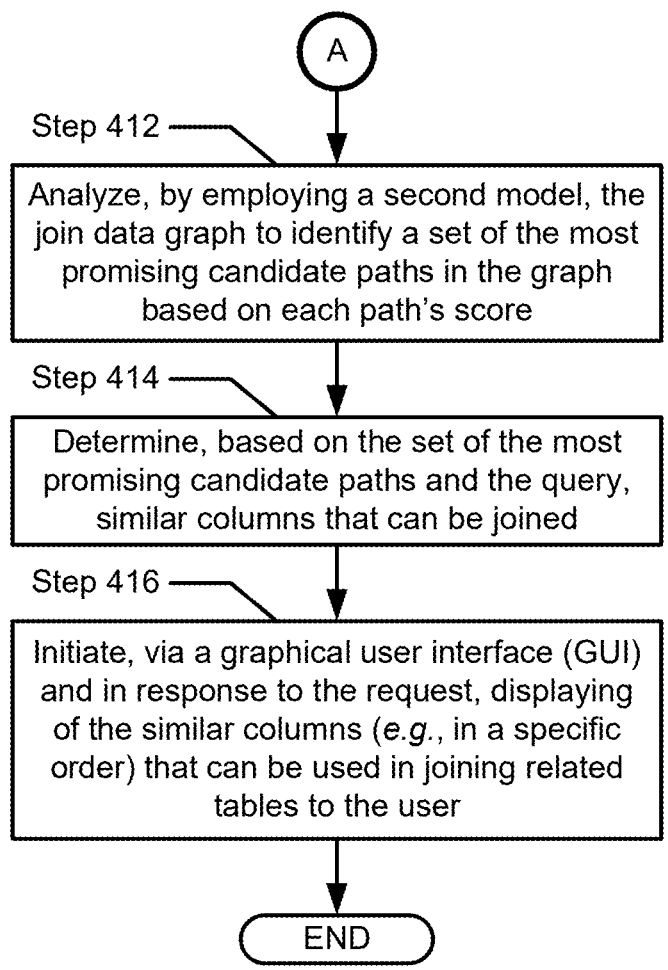
FIG. 4.2

UNDERSTANDING COMPLEX JOINS BY LEVERAGING JOIN DATA IDENTIFIERS

BACKGROUND

Devices are often capable of performing certain functionalities that other devices are not configured to perform or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIGS. 4.1-4.2 show a method for managing data in accordance with one or more embodiments disclosed herein.

DETAILED DESCRIPTION

Figure 1:
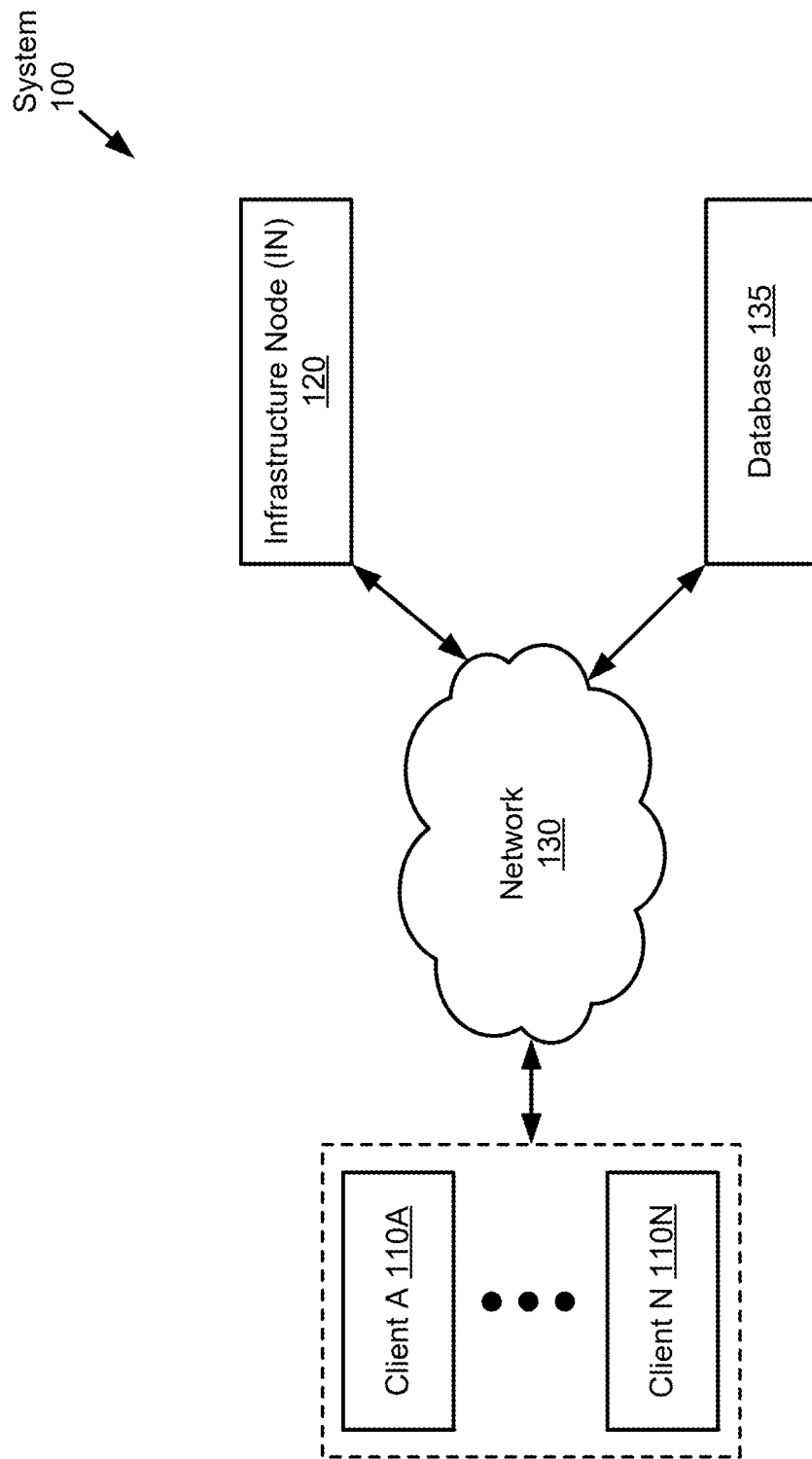
FIG. 1 shows a diagram of a system in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a join is considered as a fundamental and essential operation to connect two or more tables (and/or when collating data from multiple sources), which is applied to, for example, relational database management systems and business intelligence tools for data analysis. Similarity joins are considered as operations performed on databases to identify similar or related records (e.g., data rows, columns, etc.) based on the similarity joins' contents or attributes (e.g., properties of columns of a related table, values listed under a column of the table, etc.). The goal is to find pairs of records that are similar or have some degree of similarity according to, for example, a specific similarity metric.

In a similarity join, two or more databases (or tables) may be compared, and pairs of records may be matched based on their similarity. Given a table repository and a query table with a specified join column, joinable table discovery may find two or more target tables that can be joined based on a query. Because of the demonstrated usefulness in data enrichment, the concept of "joinable table discovery" has become a key procedure in data lake management and serves various downstream applications, especially those involving data analysis.

In particular, this concept has become useful in applications such as data integration, data cleaning, duplicate data detection, record linkage, and information retrieval, in which similarity joins are powerful operations that enable the discovery of related records in large databases (to facilitate tasks such as, for example, data integration and record linkage). For example, this concept may be useful for (i) fraud detection in identifying patterns or similarities among suspicious transactions, accounts, and/or individuals, (ii) risk management in identifying patterns and similarities among different financial products, assets, and/or market conditions, which can help in predicting and managing potential risks, (iii) customer segmentation to group customers (e.g., users, people, etc.) with similar attributes, transaction patterns, and/or financial goals (allowing for better segmentation and more effective customer relationship management), (iv) portfolio optimization in identifying similar assets (or securities) based on their risk-return characteristics (enabling investors to optimize their portfolios by selecting assets that offer similar benefits), (v) market analysis in identifying similar market conditions, price movements, and/or trading patterns (aiding in the prediction of future market behavior and guiding investment strategies), and/or (vi) anomaly detection in identify abnormal transactions and/or deviations from expected patterns in financial data.

The similarity between records is typically measured using distance metrics or similarity measures, such as the Jaccard similarity, the cosine similarity, the edit distance, or the Levenshtein distance. These metrics (and/or measures) quantify the similarity between records based on the characteristics of data, such as strings, vectors, or sets. However, it may be possible that not all records are string-like and, hence, these distance metrics might not work as expected.

Moreover, collating information from multiple tables may present several challenges, especially when dealing with large datasets or complex relational databases, such as: (i) a schema mismatch, where, when working with multiple tables, the structure and schema of the tables may not align perfectly (e.g., columns may have different names, data types, and/or formatting conventions), (ii) determination of the correct join conditions and the appropriate join type (e.g., an inner join, an outer join, etc.) can be complex, especially when dealing with large datasets and/or multiple levels of relationships, (iii) performance issues, in which working/operating with large datasets can impact query performance (e.g., joining large tables (or performing complex aggregations) can result in slow query execution times), and (iv) data inconsistency, in which inconsistent and/or incomplete data across tables can negatively affect to obtain accurate results (e.g., missing values, conflicting data, or variations in data formats can hinder effective data collation and analysis).

In most cases, implementing joins requires resource-intensive efforts (e.g., time, engineering, cost, computing resource, etc.), and online aggregation over joins was proposed to mitigate these efforts (in order to offer users a trade-off between query efficiency and accuracy in an online fashion). Existing approaches/methods target (i) equi-joins as the most common way of combining tables for creating a unified view, or (ii) semantic joins to tolerate misspellings and different formats to deliver more concrete results. However, existing/traditional approaches are either exact solutions whose execution time is proportional to the sizes of a query column and a target table repository, or approximate solutions lacking precision (and their scalability is dubious). Said in another way, traditional solutions (i) are not capable of classifying records into a particular data type, (ii) use indexing (or semantic based) approaches to identify similarity pairs (which are computationally expensive and not precise), and/or (iii) implement tree or graph-based approaches (e.g., random walks) for graph traversal.

From a different perspective, one of the key challenges (in data management systems) is ensuring that a join is performed correctly and accurately. This requires a good understanding of the data and relationships between the corresponding tables being joined, as well as the ability to write complex structured query language (SQL) queries that can handle large datasets. Another challenge is ensuring that the joined data is clean and accurate, which means that the data should be properly formatted and structured, and any duplicates (or errors) should be identified and corrected before the join (or the join process) is performed. Further, performance can also be a significant challenge when performing multiple tables joins, particularly if the data being joined is large.

For at least the reasons discussed above and without requiring resource-intensive efforts, a fundamentally different approach/framework is needed (e.g., a framework that provides one or more models, which, at least, (i) leverage inherent properties of values possessed by a related column of (a table) to classify each of the values' particular data type and/or (ii) find/infer similarities between the heuristics governed by each data type (by employing a Bayes optimality under beam search approach); a framework (i) to handle different data types across multiple tables and determine records that are similar, which can be used in joining tables with a novel, quick, accurate, and scalable model, and (ii) to handle complex acyclic queries/requests (e.g., with respect to perform multiple joins) using Bayes optimality under beam search approach; etc.).

Embodiments disclosed herein relate to methods and systems for managing data. As a result of the processes discussed below, one or more embodiments disclosed herein advantageously ensure that: (i) a novel, quick, accurate, and scalable framework is provided, in which the framework is capable of, at least, handling different data types across multiple tables and determining records that are similar in those tables (so that these records can be used in joining related tables); (ii) the framework handles complex joins (that involve multiple tables) by leveraging a model that employs a Bayes optimality under beam search approach (through the usage of probability distributions over a similarity graph (e.g., a join data graph) generated by a similarity model/algorithm (e.g., a first model)); (iii) the framework achieves over 90% accuracy (without requiring resource-intensive efforts and data pre-preprocessing (e.g., data cleaning)) in dynamically identifying a data type of a particular column (and its values/variables) and finding similar columns from other tables that can be leveraged for joins (where traditional solutions are able to achieve only 60-70% accuracy); (iv) a novel, dynamic, and robust data type classification model (e.g., the first model) is generated/designed (and employed by the framework), in which the model exploits one or more properties/features of variables (e.g., distinct values, similar distributions, etc.) to figure out a bucket/group/cluster that a particular column and/or record can be classified into (since the model designed to leverage inherent nature of data, the model is accurate and robust); (v) to handle multiple join combinations, the framework performs dynamic partitioning to avoid possible table skews during a table join process (where, instead of considering a static column value as the partition value, the framework performs dynamic partitioning to ensure the balance of rows during a table join process); (vi) the framework generates a join data graph based on, at least, column similarities (or similar columns, identified by employing a matching model (e.g., the first model)), in which to find complex join conditions that require searching through the graph, the framework employs a second model (e.g., a probabilistic model considering current and future scores of candidate nodes of the graph) learning column similarities that are Bayes optimal under beam search; (vii) the framework is scalable and applicable to any types of tables possessing different kind of values, in which the objective (of the framework) is to either find a data type of a related record, or join tables based on column similarity (both simple and complex); and/or (viii) for a better user experience, the framework empowers customer/user facing organizations to make data-driven decisions, improve user engagement, and drive business growth (of these organizations) by leveraging the power of customer similarities and/or patterns.

The following describes various embodiments disclosed herein.

FIG. 1 shows a diagram of a system (100) in accordance with one or more embodiments disclosed herein. The system (100) includes any number of clients (e.g., Client A (110A), Client N (110N), etc.), a network (130), any number of infrastructure nodes (IN) (e.g., 120), and a database (135). The system (100) may include additional, fewer, and/or different components without departing from the scope of the embodiments disclosed herein. Each component may be operably/operatively connected to any of the other components via any combination of wired and/or wireless connections. Each component illustrated in FIG. 1 is discussed below.

In one or more embodiments, the clients (e.g., 110A, 110N, etc.), the IN (120), the network (130), and the database (135) may be (or may include) physical hardware or logical devices, as discussed below. While FIG. 1 shows a specific configuration of the system (100), other configurations may be used without departing from the scope of the embodiments disclosed herein. For example, although the clients (e.g., 110A, 110N, etc.) and the IN (120) are shown to be operatively connected through a communication network (e.g., 130), the clients (e.g., 110A, 110N, etc.) and the IN (120) may be directly connected (e.g., without an intervening communication network).

Further, the functioning of the clients (e.g., 110A, 110N, etc.) and the IN (120) is not dependent upon the functioning and/or existence of the other components (e.g., devices) in the system (100). Rather, the clients and the IN may function independently and perform operations locally that do not require communication with other components. Accordingly, embodiments disclosed herein should not be limited to the configuration of components shown in FIG. 1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of clients (e.g., 110A, 110N, etc.). For example, the system may be configured to organize unbounded, continuously generated data into a data stream. The system (100) may also represent a comprehensive middleware layer executing on computing devices (e.g., 500, FIG. 5) that supports application and storage environments.

In one or more embodiments, the system (100) may support one or more virtual machine (VM) environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the clients (e.g., 110A, 110N, etc.)) and other computations remotely (e.g., away from the users' site using the IN (120)) from the users. By doing so, the users may utilize different computing devices (e.g., 500, FIG. 5) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client (described below). The resource may be delivered to the client via, for example (but not limited to): conventional installation, a method for streaming, a VM executing on a remote computing device, execution from a removable storage device connected to the client (such as universal serial bus (USB) device), etc.

In one or more embodiments, a client (e.g., 110A, 110N, etc.) may include functionality to, e.g.: (i) capture sensory input (e.g., sensor data) in the form of text, audio, video, touch or motion, (ii) collect massive amounts of data at the edge of an Internet of Things (IoT) network (where, the collected data may be grouped as: (a) data that needs no further action and does not need to be stored, (b) data that should be retained for later analysis and/or record keeping, and (c) data that requires an immediate action/response), (iii) provide to other entities (e.g., the IN (120)), store, or otherwise utilize captured sensor data (and/or any other type and/or quantity of data), and (iv) provide surveillance services (e.g., determining object-level information, performing face recognition, etc.) for scenes (e.g., a physical region of space). One of ordinary skill will appreciate that the client may perform other functionalities without departing from the scope of the embodiments disclosed herein.

In one or more embodiments, the clients (e.g., 110A, 110N, etc.) may be geographically distributed devices (e.g., user devices, front-end devices, etc.) and may have relatively restricted hardware and/or software resources when compared to the IN (120). As being, for example, a sensing device, each of the clients may be adapted to provide monitoring services. For example, a client may monitor the state of a scene (e.g., objects disposed in a scene). The monitoring may be performed by obtaining sensor data from sensors that are adapted to obtain information regarding the scene, in which a client may include and/or be operatively coupled to one or more sensors (e.g., a physical device adapted to obtain information regarding one or more scenes).

In one or more embodiments, the sensor data may be any quantity and types of measurements (e.g., of a scene's properties, of an environment's properties, etc.) over any period(s) of time and/or at any points-in-time (e.g., any type of information obtained from one or more sensors, in which different portions of the sensor data may be associated with different periods of time (when the corresponding portions of sensor data were obtained)). The sensor data may be obtained using one or more sensors. The sensor may be, for example (but not limited to): a visual sensor (e.g., a camera adapted to obtain optical information (e.g., a pattern of light scattered off of the scene) regarding a scene/environment), an audio sensor (e.g., a microphone adapted to obtain auditory information (e.g., a pattern of sound from the scene) regarding a scene), an electromagnetic radiation sensor (e.g., an infrared sensor), a chemical detection sensor, a temperature sensor, a humidity sensor, a count sensor, a distance sensor, a global positioning system sensor, a biological sensor, a differential pressure sensor, a corrosion sensor, etc.

In one or more embodiments, the clients (e.g., 110A, 110N, etc.) may be physical or logical computing devices configured for hosting one or more workloads, or for providing a computing environment whereon workloads may be implemented. The clients may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the clients). The clients (e.g., 110A, 110N, etc.) may correspond to computing devices that one or more users use to interact with one or more components of the system (100).

In one or more embodiments, a client (e.g., 110A, 110N, etc.) may represent a physical appliance or a computing device operated by one or more individuals of (or employed by) an organization. Examples of said individual(s) may include, but not limited to, any organization executive(s) (e.g., chief executive officer (CEO), chief financial officer (CFO), etc.), and any employee(s) in the accounting/finance team of the organization (e.g., a collector person). Further, the organization may refer to any enterprise at least engaged in for-profit commercial, industrial, or professional activities.

In one or more embodiments, a client (e.g., 110A, 110N, etc.) may include any number of applications (and/or content accessible through the applications) that provide computer-implemented services to a user. Applications may be designed and configured to perform one or more functions instantiated by a user of the client. In order to provide application services, each application may host similar or different components. The components may be, for example (but not limited to): instances of databases, instances of email servers, etc. Applications may be executed on one or more clients as instances of the application.

Applications may vary in different embodiments, but in certain embodiments, applications may be custom developed or commercial (e.g., off-the-shelf) applications that a user desires to execute in a client (e.g., 110A, 110N, etc.). In one or more embodiments, applications may be logical entities executed using computing resources of a client. For example, applications may be implemented as computer instructions stored on persistent storage of the client that when executed by the processor(s) of the client, cause the client to provide the functionality of the applications described throughout the application.

In one or more embodiments, while performing, for example, one or more operations requested by a user, applications installed on a client (e.g., 110A, 110N, etc.) may include functionality to request and use physical and logical resources of the client. Applications may also include functionality to use data stored in storage/memory resources of the client. The applications may perform other types of functionalities not listed above without departing from the scope of the embodiments disclosed herein. While providing application services to a user, applications may store data that may be relevant to the user in storage/memory resources of the client.

In one or more embodiments, to provide services to the users, the clients (e.g., 110A, 110N, etc.) may utilize, rely on, or otherwise cooperate with the IN (120). For example, the clients may issue requests to the IN to receive responses and interact with various components of the IN. The clients may also request data from and/or send data to the IN (for example, the clients may transmit information to the IN that allows the IN to perform computations, the results of which are used by the clients to provide services to the users). As yet another example, the clients may utilize computer-implemented services provided by the IN. When the clients interact with the IN, data that is relevant to the clients may be stored (temporarily or permanently) in the IN.

In one or more embodiments, a client (e.g., 110A, 110N, etc.) may be capable of, e.g.: (i) collecting users' inputs, (ii) correlating collected users' inputs to the computer-implemented services to be provided to the users, (iii) communicating with the IN (120) that perform computations necessary to provide the computer-implemented services, (iv) using the computations performed by the IN to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the clients (e.g., 110A, 110N, etc.) may provide computer-implemented services to users (and/or other computing devices). The clients may provide any number and any type of computer-implemented services. To provide computer-implemented services, each client may include a collection of physical components (e.g., processing resources, storage/memory resources, networking resources, etc.) configured to perform operations of the client and/or otherwise execute a collection of logical components (e.g., virtualization resources) of the client.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to): a hard disk drive (HDD), a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the clients (e.g., 110A, 110N, etc.) provide computer-implemented services to users, the clients may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the clients (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a network interface card (NIC), a network adapter, a network processor, etc.

In one or more embodiments, a networking resource may provide capabilities to interface a client with external entities (e.g., the IN (120)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client and the external entities. For example, a networking resource may enable the client to be operatively connected, via Ethernet, using a TCP protocol to form a "network fabric", and may enable the communication of data between the client and the external entities. In one or more embodiments, each client may be given a unique identifier (e.g., an Internet Protocol (IP) address) to be used when utilizing the above-mentioned protocols.

Further, a networking resource, when using a certain protocol or a variant thereof, may support streamlined access to storage/memory media of other clients (e.g., 110A, 110N, etc.). For example, when utilizing remote direct memory access (RDMA) to access data on another client, it may not be necessary to interact with the logical components of that client. Rather, when using RDMA, it may be possible for the networking resource to interact with the physical components of that client to retrieve and/or transmit data, thereby avoiding any higher-level processing by the logical components executing on that client.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client that when executed by processing resources of the client, cause the client to provide the functionality of the hypervisor.

In one or more embodiments, a client (e.g., 110A, 110N, etc.) may be, for example (but not limited to): a physical computing device, a smartphone, a tablet, a wearable, a gadget, a closed-circuit television (CCTV) camera, a music player, a game controller, etc. Different clients may have different computational capabilities. In one or more embodiments, Client A (110A) may have 16 gigabytes (GB) of dynamic RAM (DRAM) and 1 CPU with 12 cores, whereas Client N (110N) may have 8 GB of PMEM and 1 CPU with 16 cores. Other different computational capabilities of the clients not listed above may also be considered without departing from the scope of the embodiments disclosed herein.

Figure 5:
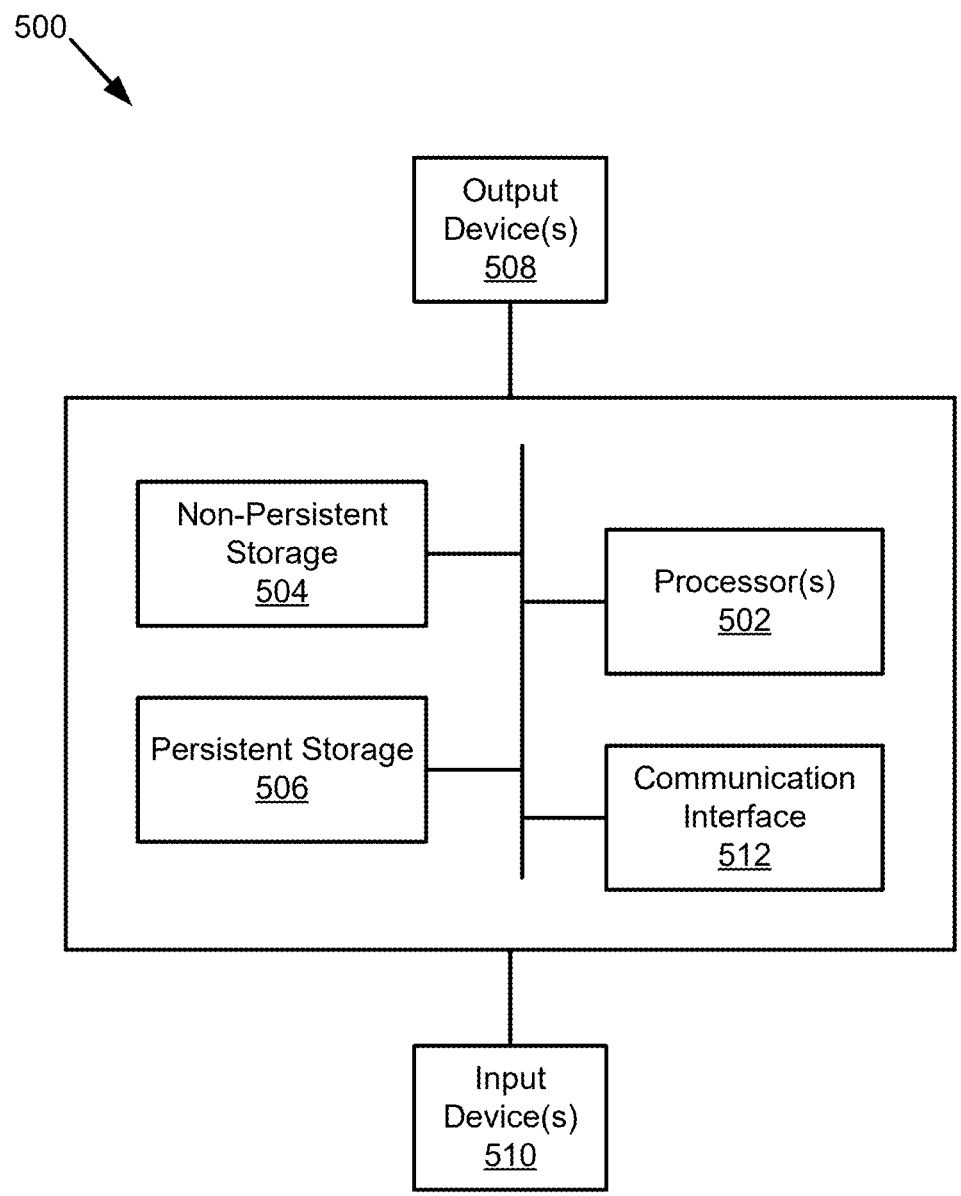
FIG. 5 shows a diagram of a computing device in accordance with one or more embodiments disclosed herein.

Further, in one or more embodiments, a client (e.g., 110A, 110N, etc.) may be implemented as a computing device (e.g., 500, FIG. 5). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client described throughout the application.

Alternatively, in one or more embodiments, the client (e.g., 110A, 110N, etc.) may be implemented as a logical device (e.g., a VM). The logical device may utilize the computing resources of any number of computing devices to provide the functionality of the client described throughout this application.

In one or more embodiments, users (e.g., customers, administrators, organization executives, etc.) may interact with (or operate) the clients (e.g., 110A, 110N, etc.) in order to perform work-related tasks (e.g., production workloads). In one or more embodiments, the accessibility of users to the clients may depend on a regulation set by an administrator of the clients. To this end, each user may have a personalized user account that may, for example, grant access to certain data, applications, and computing resources of the clients. This may be realized by implementing the virtualization technology. In one or more embodiments, an administrator may be a user with permission (e.g., a user that has root-level access) to make changes on the clients that will affect other users of the clients.

In one or more embodiments, for example, a user may be automatically directed to a login screen of a client when the user connected to that client. Once the login screen of the client is displayed, the user may enter credentials (e.g., username, password, etc.) of the user on the login screen. The login screen may be a graphical user interface (GUI) generated by a visualization module (not shown) of the client. In one or more embodiments, the visualization module may be implemented in hardware (e.g., circuitry), software, or any combination thereof.

In one or more embodiments, a GUI may be displayed on a display of a computing device (e.g., 500, FIG. 5) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, the IN (120) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the IN (120) may include functionality to, e.g.: (i) obtain (or receive) data (e.g., any type and/or quantity of input) from any source (and, if necessary, aggregate the data); (ii) perform complex analytics and analyze data that is received from one or more clients (e.g., 110A, 110N, etc.) to generate additional data that is derived from the obtained data without experiencing any middleware and hardware limitations; (iii) provide meaningful information (e.g., a response) back to the corresponding clients; (iv) filter data (e.g., received from a client) before pushing the data (and/or the derived data) to the database (135) for management of the data and/or for storage of the data (while pushing the data, the IN may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the clients; (viii) provide robust security features to the clients and make sure that a minimum level of service is always provided to a user of a client; (ix) transmit the result(s) of the computing work performed (e.g., real-time business insights, equipment maintenance predictions, other actionable responses, etc.) to another IN (not shown) for review and/or other human interactions; (x) exchange data with other devices registered in/to the network (130) in order to, for example, participate in a collaborative workload placement (e.g., the node may split up a request (e.g., an operation, a task, an activity, etc.) with another IN, coordinating its efforts to complete the request more efficiently than if the IN had been responsible for completing the request); (xi) provide software-defined data protection for the clients (e.g., 110A, 110N, etc.); (xii) provide automated data discovery, protection, management, and recovery operations for the clients; (xiii) monitor operational states of the clients; (xiv) regularly back up configuration information of the clients to the database (135); (xv) provide (e.g., via a broadcast, multicast, or unicast mechanism) information (e.g., a location identifier, the amount of available resources, etc.) associated with the IN to other INs of the system (100); (xvi) configure or control any mechanism that defines when, how, and what data to provide to the clients and/or database; (xvii) provide data deduplication; (xviii) orchestrate data protection through one or more GUIs; (xix) empower data owners (e.g., users of the clients) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud-native environments; (xxiii) consolidate multiple data process or protection requests (received from, for example, clients) so that duplicative operations (which may not be useful for restoration purposes) are not generated; (xxiv) initiate multiple data process or protection operations in parallel (e.g., an IN may host multiple operations, in which each of the multiple operations may (a) manage the initiation of a respective operation and (b) operate concurrently to initiate multiple operations); and/or (xxv) manage operations of one or more clients (e.g., receiving information from the clients regarding changes in the operation of the clients) to improve their operations (e.g., improve the quality of data being generated, decrease the computing resources cost of generating data, etc.). In one or more embodiments, in order to read, write, or store data, the IN (120) may communicate with, for example, the database (135) and/or other storage devices in the system (100).

As described above, the IN (120) may be capable of providing a range of functionalities/services to the users of the clients (e.g., 110A, 110N, etc.). However, not all users may be allowed to receive all of the services. To manage the services provided to the users of the clients, a system (e.g., a service manager) in accordance with embodiments disclosed herein may manage the operation of a network (e.g., 130), in which the clients are operably connected to the IN. Specifically, the service manager (i) may identify services to be provided by the IN (for example, based on the number of users using the clients) and (ii) may limit communications of the clients to receive IN provided services.

For example, the priority (e.g., the user access level) of a user may be used to determine how to manage computing resources of the IN (120) to provide services to that user. As yet another example, the priority of a user may be used to identify the services that need to be provided to that user. As yet another example, the priority of a user may be used to determine how quickly communications (for the purposes of providing services in cooperation with the internal network (and its subcomponents)) are to be processed by the internal network.

Further, consider a scenario where a first user is to be treated as a normal user (e.g., a non-privileged user, a user with a user access level/tier of 4/10). In such a scenario, the user level of that user may indicate that certain ports (of the subcomponents of the network (130) corresponding to communication protocols such as the TCP, the UDP, etc.) are to be opened, other ports are to be blocked/disabled so that (i) certain services are to be provided to the user by the IN (120) (e.g., while the computing resources of the IN may be capable of providing/performing any number of remote computer-implemented services, they may be limited in providing some of the services over the network (130)) and (ii) network traffic from that user is to be afforded a normal level of quality (e.g., a normal processing rate with a limited communication bandwidth (BW)). By doing so, (i) computer-implemented services provided to the users of the clients (e.g., 110A, 110N, etc.) may be granularly configured without modifying the operation(s) of the clients and (ii) the overhead for managing the services of the clients may be reduced by not requiring modification of the operation(s) of the clients directly.

In contrast, a second user may be determined to be a high priority user (e.g., a privileged user, a user with a user access level of 9/10). In such a case, the user level of that user may indicate that more ports are to be opened than were for the first user so that (i) the IN (120) may provide more services to the second user and (ii) network traffic from that user is to be afforded a high-level of quality (e.g., a higher processing rate than the traffic from the normal user).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single IN (e.g., 120) is considered above, the term "node" includes any collection of systems or sub-systems that individually or jointly execute a set, or multiple sets, of instructions to provide one or more computer-implemented services. For example, a single IN may provide a computer-implemented service on its own (i.e., independently) while multiple other nodes may provide a second computer-implemented service cooperatively (e.g., each of the multiple other nodes may provide similar and or different services that form the cooperatively provided service).

As described above, the IN (120) may provide any quantity and any type of computer-implemented services. To provide computer-implemented services, the IN may be a heterogeneous set, including a collection of physical components/resources (discussed above) configured to perform operations of the node and/or otherwise execute a collection of logical components/resources (discussed above) of the node.

In one or more embodiments, the IN (120) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the IN (120) may perform other functionalities without departing from the scope of the embodiments disclosed herein. In one or more embodiments, the IN may be configured to perform (in conjunction with the database (135)) all, or a portion, of the functionalities described in FIGS. 4.1-4.2.

In one or more embodiments, the IN (120) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the IN described throughout the application.

Alternatively, in one or more embodiments, similar to a client (e.g., 110A, 110N, etc.), the IN (120) may also be implemented as a logical device.

Figures 2, 3:
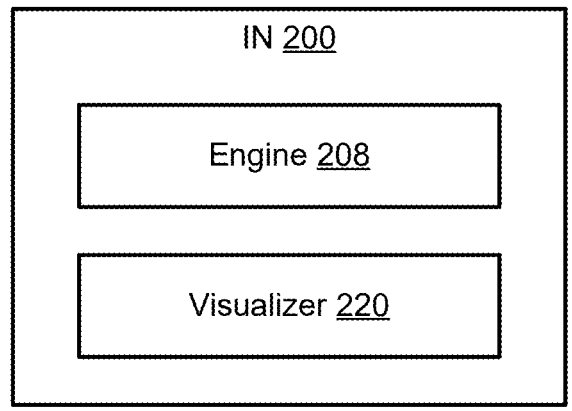
FIG. 2 shows a diagram of an infrastructure node in accordance with one or more embodiments disclosed herein.
FIG. 3 shows an example use case in accordance with one or more embodiments disclosed herein.

In one or more embodiments, the IN (120) may host an engine (e.g., 208, FIG. 2) and a visualizer (e.g., 220, FIG. 2). Additional details of the engine and the visualizer are described below in reference to FIG. 2. In the embodiments of the present disclosure, the database (135) is demonstrated as a separate entity from the IN (120); however, embodiments disclosed herein are not limited as such. The database (135) may be demonstrated as a part of the IN (e.g., as deployed to the IN).

In one or more embodiments, all, or a portion, of the components of the system (100) may be operably connected each other and/or other entities via any combination of wired and/or wireless connections. For example, the aforementioned components may be operably connected, at least in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the clients, the IN, etc.). As discussed above, components of the system (100) may operatively connect to one another through the network (e.g., a storage area network (SAN), a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the clients and the IN through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Turning now to the database (135), the database (135) may provide long-term, durable, high read/write throughput data storage/protection with near-infinite scale and low-cost. The database (135) may be a fully managed cloud/remote (or local) storage (e.g., pluggable storage, object storage, block storage, file system storage, data stream storage, Web servers, unstructured storage, etc.) that acts as a shared storage/memory resource that is functional to store unstructured and/or structured data. Further, the database (135) may also occupy a portion of a physical storage/memory device or, alternatively, may span across multiple physical storage/memory devices.

In one or more embodiments, the database (135) may be implemented using physical devices that provide data storage services (e.g., storing data and providing copies of previously stored data). The devices that provide data storage services may include hardware devices and/or logical devices. For example, the database (135) may include any quantity and/or combination of memory devices (i.e., volatile storage), long-term storage devices (i.e., persistent storage), other types of hardware devices that may provide short-term and/or long-term data storage services, and/or logical storage devices (e.g., virtual persistent storage/virtual volatile storage).

For example, the database (135) may include a memory device (e.g., a dual in-line memory device), in which data is stored and from which copies of previously stored data are provided. As yet another example, the database (135) may include a persistent storage device (e.g., an SSD), in which data is stored and from which copies of previously stored data is provided. As yet another example, the database (135) may include (i) a memory device in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data).

Further, the database (135) may also be implemented using logical storage. Logical storage (e.g., virtual disk) may be implemented using one or more physical storage devices whose storage resources (all, or a portion) are allocated for use using a software layer. Thus, logical storage may include both physical storage devices and an entity executing on a processor or another hardware device that allocates storage resources of the physical storage devices.

In one or more embodiments, the database (135) may store/record unstructured and/or structured data (e.g., in the form of a set of tables) that may include (or specify), for example (but not limited to): an identifier of a user/customer (e.g., a unique string or combination of bits associated with a particular user); a request received from a user (or a user's account); a geographic location (e.g., a country) associated with the user; a timestamp showing when a specific request is processed by an application; a port number (e.g., associated with a hardware component of a client (e.g., 110A)); a protocol type associated with a port number; computing resource details (including details of hardware components and/or software components) and an IP address of an IN (e.g., 120) hosting an application where a specific request is processed; an identifier of an application; information with respect to historical metadata (e.g., system logs, applications logs, telemetry data including past and present device usage of one or more computing devices in the system (100), etc.); computing resource details and an IP address of a client that sent a specific request (e.g., to the IN (120)); one or more points-in-time and/or one or more periods of time associated with a data recovery event; data for execution of applications/services (including IN applications and associated endpoints); corpuses of annotated data used to build/generate and train processing classifiers for trained ML models; linear, non-linear, and/or ML model parameters (e.g., instructions to the engine (e.g., 208, FIG. 2) on how to train and/or fine-tune a model); an identifier of a sensor; a product identifier of a client (e.g., 110A); a type of a client; historical sensor data/input (e.g., visual sensor data, audio sensor data, electromagnetic radiation sensor data, temperature sensor data, humidity sensor data, corrosion sensor data, etc., in the form of text, audio, video, touch, and/or motion) and its corresponding details; an identifier of a data item; a size of the data item; a distributed model identifier that uniquely identifies a distributed model; a user activity performed on a data item; a cumulative history of user/administrator activity records obtained over a prolonged period of time; a setting (and a version) of a mission critical application executing on an IN (e.g., 120); an SLA/SLO set by a user; a data protection policy (e.g., an affinity-based backup policy) implemented by a user (e.g., to protect a local data center, to perform a rapid recovery, etc.); a configuration setting of that policy; product configuration information associated with a client; a number of each type of a set of assets protected by an IN (e.g., 120); a size of each of the set of assets protected; a number of each type of a set of data protection policies implemented by a user; configuration information associated with the engine (e.g., 208, FIG. 2) (to manage security, network traffic, network access, or any other function/operation performed by the engine); a job detail of a job (e.g., a data protection job, a data restoration job, a log retention job, etc.) that has been initiated by an IN (e.g., 120); a type of the job (e.g., a non-parallel processing job, a parallel processing job, an analytics job, etc.); information associated with a hardware resource set (discussed below) of the IN (120); a completion timestamp encoding a date and/or time reflective of a successful completion of a job; a time duration reflecting the length of time expended for executing and completing a job; a backup retention period associated with a data item; a status of a job (e.g., how many jobs are still active, how many jobs are completed, etc.); a number of requests handled (in parallel) per minute (or per second, per hour, etc.) by the analyzer; a number of errors encountered when handling a job; a documentation that shows how the analyzer performs against an SLO and/or an SLA; information regarding an administrator (e.g., a high-priority trusted administrator, a low-priority trusted administrator, etc.) related to an analytics job; a workflow (e.g., a policy that dictates how a workload should be configured and/or protected, such as an SQL workflow dictates how an SQL workload should be protected) set (by a user); a type of a workload that is tested/validated by an administrator per data protection policy; a practice recommended by a vendor (e.g., a single data protection policy should not protect more than 100 assets; for a dynamic NAS, maximum one billion files can be protected per day, etc.); one or more device state paths corresponding to a hardware device (e.g., a client); an existing knowledge base (KB) article; a technical support history documentation of a customer/user; a port's user guide; a port's release note; a community forum question and its associated answer; a catalog file of an application upgrade; details of a compatible OS version for an application upgrade to be installed; an application upgrade sequence; a solution or a workaround document for a software failure; one or more lists that specify which computer-implemented services should be provided to which user (depending on a user access level of a user); a fraud report for an invalid user; a set of SLAs (e.g., an agreement that indicates a period of time required to retain a profile of a user); information with respect to a user/customer experience; etc.

In one or more embodiments, information associated with a hardware resource set (e.g., including at least resource related parameters) may specify, for example (but not limited to): a configurable CPU option (e.g., a valid/legitimate vCPU count per IN in the system (100)), a configurable network resource option (e.g., enabling/disabling single-root input/output virtualization (SR-IOV) for the IN (120)), a configurable memory option (e.g., maximum and minimum memory per IN in the system (100)), a configurable GPU option (e.g., allowable scheduling policy and/or virtual GPU (vGPU) count combinations per IN in the system (100)), a configurable DPU option (e.g., legitimacy of disabling inter-integrated circuit (I2C) for various INs in the system (100)), a configurable storage space option (e.g., a list of disk cloning technologies across one or more INs in the system (100)), a configurable storage input/output (I/O) option (e.g., a list of possible file system block sizes across all target file systems), a user type (e.g., a knowledge worker, a task worker with relatively low-end compute requirements, a high-end user that requires a rich multimedia experience, etc.), a network resource related template (e.g., a 10 GB/s BW with 20 ms latency quality of service (QOS) template), a DPU related template (e.g., a 1 GB/s BW vDPU with 1 GB vDPU frame buffer template), a GPU related template (e.g., a depth-first vGPU with 1 GB vGPU frame buffer template), a storage space related template (e.g., a 40 GB SSD storage template), a CPU related template (e.g., a 1 vCPU with 4 cores template), a memory resource related template (e.g., an 8 GB DRAM template), a vCPU count per analytics engine, a virtual NIC (vNIC) count per IN in the system (100), a wake on LAN support configuration (e.g., supported/enabled, not supported/disabled, etc.), a vGPU count per IN in the system (100), a type of a vGPU scheduling policy (e.g., a "fixed share" vGPU scheduling policy), a storage mode configuration (e.g., an enabled high-performance storage array mode), etc.

In one or more embodiments, as being telemetry data, a system log (e.g., a file that records system activities across hardware and/or software components of a client, an internal lifecycle controller log (which may be generated as a result of internal testing of a NIC), etc.) may include (or specify), for example (but not limited to): a type of an asset (e.g., a type of a workload such as an SQL database, a NAS executing on-premises, a VM executing on a multi-cloud infrastructure, etc.) that is utilized by a user; computing resource utilization data (or key performance metrics including estimates, measurements, etc.) (e.g., data related to a user's maximum, minimum, and average CPU utilizations, an amount of storage or memory resource utilized by a user, an amount of networking resource utilized by user to perform a network operation, etc.) regarding computing resources of a client (e.g., 110A); an alert that is triggered in a client (e.g., based on a failed cloud disaster recovery operation (which is initiated by a user), the client may generate a failure alert); an important keyword associated with a hardware component of a client (e.g., recommended maximum CPU operating temperature is 75° C.); a computing functionality of a microservice (e.g., Microservice A's CPU utilization is 26%, Microservice B's GPU utilization is 38%, etc.); an amount of storage or memory resource (e.g., stack memory, heap memory, cache memory, etc.) utilized by a microservice (e.g., executing on a client); a certain file operation performed by a microservice; an amount of networking resource utilized by a microservice to perform a network operation (e.g., to publish and coordinate inter-process communications); an amount of bare metal communications executed by a microservice (e.g., I/O operations executed by the microservice per second); a quantity of threads (e.g., a term indicating the quantity of operations that may be handled by a processor at once) utilized by a process that is executed by a microservice; an identifier of a client's manufacturer; media access control (MAC) information of a client; an amount of bare metal communication executed by a client (e.g., I/O operations executed by a client per second); etc.

In one or more embodiments, an alert (e.g., a predictive alert, a proactive alert, a technical alert, etc.) may be defined by a vendor of a corresponding client (e.g., 110A), by an administrator, by another entity, or any combination thereof. In one or more embodiments, an alert may specify, for example (but not limited to): a medium-level of CPU overheating is detected, a recommended maximum CPU operating temperature is exceeded, etc. Further, an alert may be defined based on a data protection policy.

In one or more embodiments, an important keyword may be defined by a vendor of a corresponding client (e.g., 110A), by a technical support specialist, by the administrator, by another entity, or any combination thereof. In one or more embodiments, an important keyword may be a specific technical term or a vendor specific term that is used in a system log.

In one or more embodiments, as being telemetry data, an application log may include (or specify), for example (but not limited to): a type of a file system (e.g., a new technology file system (NTFS), a resilient file system (ReFS), etc.); a product identifier of an application; a version of an OS that an application is executing on; a display resolution configuration of a client; a health status of an application (e.g., healthy, unhealthy, etc.); warnings and/or errors reported for an application; a language setting of an OS; a setting of an application (e.g., a current setting that is being applied to an application either by a user or by default, in which the setting may be a font option that is selected by the user, a background setting of the application, etc.); a version of an application; a warning reported for an application (e.g., unknown software exception (0xc00d) occurred in the application at location 0x0007d); a type of an OS (e.g., a workstation OS); an amount of storage used by an application; a size of an application (size (e.g., 5 Megabytes (5 MB), 5 GB, etc.) of an application may specify how much storage space is being consumed by that application); a type of an application (a type of an application may specify that, for example, the application is a support, deployment, or recycling application); a priority of an application (e.g., a priority class of an application, described below); active and inactive session counts; etc.

As used herein, "unhealthy" may refer to a compromised health state (e.g., an unhealthy state), indicating a corresponding entity (e.g., a hardware component, a client, an application, etc.) has already or is likely to, in the future, be no longer able to provide the services that the entity has previously provided. The health state determination may be made via any method based on the aggregated health information without departing from the scope of the embodiments disclosed herein.

In one or more embodiments, metadata (e.g., system logs, application logs, etc.) may be obtained (or dynamically fetched) as they become available (e.g., with no user manual intervention), or by the engine (e.g., 208, FIG. 2) polling a corresponding client (e.g., 110A) (by making schedule-driven/periodic application programming interface (API) calls to the client without affecting the client's ongoing production workloads) for newer metadata, for example, before analyzing a health state of the client. Based on receiving the API calls from the engine, the client may allow the engine to obtain the metadata.

In one or more embodiments, the metadata may be obtained (or streamed) continuously as they generated, or they may be obtained in batches, for example, in scenarios where (i) the engine (e.g., 208, FIG. 2) receives a metadata analysis request (or a health state check request for a client), (ii) another IN of the system (100) accumulates the metadata and provides them to the engine at fixed time intervals, or (iii) the database (135) stores the metadata and notify the engine to access the metadata from the database. In one or more embodiments, metadata may be access-protected for a transmission from the database (135) to the engine (e.g., 208, FIG. 2), e.g., using encryption.

While the unstructured and/or structured data are illustrated as separate data structures and have been discussed as including a limited amount of specific information, any of the aforementioned data structures may be divided into any number of data structures, combined with any number of other data structures, and/or may include additional, less, and/or different information without departing from the scope of the embodiments disclosed herein.

Additionally, while illustrated as being stored in the database (135), any of the aforementioned data structures may be stored in different locations (e.g., in persistent storage of other computing devices) and/or spanned across any number of computing devices without departing from the scope of the embodiments disclosed herein.

In one or more embodiments, the unstructured and/or structured data may be updated (automatically) by third-party systems (e.g., platforms, marketplaces, etc.) (provided by vendors) and/or by the administrators based on, for example, newer (e.g., updated) versions of external information. The unstructured and/or structured data may also be updated when, for example (but not limited to): newer system logs are received, a state of the engine (e.g., 208, FIG. 2) is changed, etc.

While the database (135) has been illustrated and described as including a limited number and type of data, the database (135) may store additional, less, and/or different data without departing from the scope of the embodiments disclosed herein. One of ordinary skill will appreciate that the database (135) may perform other functionalities without departing from the scope of the embodiments disclosed herein.

While FIG. 1 shows a configuration of components, other system configurations may be used without departing from the scope of the embodiments disclosed herein.

Turning now to FIG. 2, FIG. 2 shows a diagram of an IN (200) in accordance with one or more embodiments disclosed herein. The IN (200) may be an example of the IN discussed above in reference to FIG. 1. The IN (200) includes the engine (208) and the visualizer (220). The IN (200) may include additional, fewer, and/or different components without departing from the scope of the embodiments disclosed herein. Each component may be operably connected to any of the other component via any combination of wired and/or wireless connections. Each component illustrated in FIG. 2 is discussed below.

In one or more embodiments, the engine (208) may include functionality to implement two pipelines: (i) a first pipeline to employ a dynamic, quick, accurate, scalable, and a customized solution architecture to determine join "column" pairs based on column similarity and (ii) a second pipeline to implement one or more acyclic queries leveraging a Bayes optimality under beam search approach over a join data graph.

The First Pipeline

In general, understanding the type of data may be crucial for selecting appropriate analysis methods/techniques and visualizations, as different techniques may be used to handle and interpret each type of data. There may be different kinds of data types in related tables including, for example (but not limited to): identifier, categorical, numeric, datetime, string, rest (e.g., some data types that may not be classified into any of the aforementioned types may be regarded as "rest" type of data), etc.

In one or more embodiments, for at least the aforementioned reasons, the engine (208) may analyze each variable (where a variable may correspond to a column of a table, values listed under the column, etc.) of a related table by employing a set of linear, non-linear, and/or ML models (e.g., a first model). Based on the analyzing, the engine (208) may then classify/categorize (with a high-level of accuracy because the first model considers the nature of values exhibited by different data types), via the first model, each variable's data type (as, for example, a categorical variable (e.g., a categorical column), a numeric variable (e.g., a numeric column), etc.) into a specific data type bucket/group.

In one or more embodiments, an "identifier" data type may be used to uniquely identify an object/entity within a corresponding table. An identifier may be a numerical or alphanumeric value assigned to an object for identification purposes. In one or more embodiments, when 90% of the values of a related column have the same length and the number of unique value lengths in the column is limited, a data type of the column may be classified as an identifier column.

In one or more embodiments, a "categorical" data type may represent qualitative (or discrete) variables that belong to specific categories/groups. These variables (e.g., gender) may not have a mathematical meaning (or a numerical value) associated with them. In one or more embodiments, when most of the values of a related column are not quantitative and a number of distinct values in the column is limited, a data type of the column may be classified/labelled/tagged as a categorical column (and the values may be labelled as categorical variables).

In one or more embodiments, a "numerical" data type may represent quantitative variables that have a numerical value (e.g., a price value) and can be subjected to mathematical operations (e.g., addition, subtraction, multiplication, division, etc.). In one or more embodiments, when (i) most of the values of a related column are quantitative and are not character representations (e.g., when the column includes negative values, when the column includes decimal values, etc.) and (ii) a number of distinct value lengths in the column is high, a data type of the column may be classified as a numeric column.

In one or more embodiments, a "string" data type may represent a sequence of characters, for example, to store textual data (e.g., a name, an address, a message, etc.). In one or more embodiments, when 90% of the values of a related column are character representations and a number of unique value lengths in the column is not limited (e.g., is high), a data type of the column may be classified as a string column.

In one or more embodiments, a "datetime" data type may represent variables that have, for example, a date, a month, and/or a year associated with them. In one or more embodiments, when a variable (e.g., most of the values of a related column) have a characteristic feature (e.g., specifying date or time information), a data type of the variable (e.g., the column) may be classified as a datetime variable.

Thereafter, by employing a variation of the first model (e.g., a matching model/algorithm), the engine (208) may analyze each pair/combination of the same data type columns based on a different metric/threshold to identify a set of columns that is similar based on each variable's (of a corresponding column) data type. The engine (208) may employ the first model for the aforementioned identification and a variation of the first model to treat each combination of data types differently because when a join condition is defined on multiple tables, only the columns that belong to the same data type/category can be considered as potential joinable columns.

For example, for the "categorical*categorical" combination (e.g., when two columns (that forms a column pair) are both classified as categorical columns), the engine (208) may employ a first variation of the first model (see below formula) to identify the intersection of distinct set of values from a related column pair. In this example, when the length of intersection values over the total number of distinct values is above a predetermined threshold (or threshold value), the engine (208) may infer that the columns are similar (or not).

max ((len (intersect (C1, C2))/len (C1)), (len (intersect (C1, C2))/len (C2)))>threshold Assume here that Column 1 (C1) has A-C (as the distinct set of values) and Column 2 (C2) has A-D (as the distinct set of values), in which the intersection is A-C and the length of the intersection is 3. Based on the first variation of the model, (i) "len (intersect (C1, C2))/len (C1)" is equal to 1 and "len (intersect (C1, C2))/len (C2)" is equal to 0.75, and (ii) the maximum of 1 and 0.75 is 1, in which if 1 is greater than the threshold, the engine (208) may infer that the columns are similar. Otherwise, the engine (208) may infer that the columns are not similar.

As yet another example, for the "identifier*identifier" combination (e.g., when two columns (that forms a column pair) are both classified as identifier columns), the engine (208) may employ a second variation of the first model to, for all the values, find the most commonly occurring length (where, in some cases, it may be possible that a small percentage of identifier column values show/have different lengths). In this example, for a selected value length, the engine (208) may iterate the second variation of the first model through all related column values (e.g., using a sliding window approach) and find the intersection of values character by character (e.g., to infer how many characters (for each identifier variable) are matching). When a fraction of the intersection over the entire length of column values is greater than a second predetermined threshold, the engine (208) may infer that the columns are similar. Otherwise, the engine (208) may infer that the columns are not similar.

As yet another example, for the "numeric*numeric" combination (e.g., when two columns (that forms a column pair) are both classified as numeric columns), the engine (208) may employ a third variation of the first model to categorize related numeric values into a positive bucket or a negative bucket. In this example, each bucket is treated separately, and the probability distribution of each bucket is compared (to infer whether or not they are similar) using the Kolmogorov-Smirnov (KS) test (which is applied by the third variation of the first model), in which the empirical distribution function of a given set of sample values is defined as:

$$F_n(x) = \frac{\text{number of (elements in the sample} \leq x)}{n} = \frac{1}{n}\sum_{i=1}^{n} 1_{(-\infty, x]}(X_i)$$

where the Kullback-Leibler (KL) divergence/statistic for $F_n(x)$ is $D_n = \sup_x |F_n(x) - F_n(x)|$, n represents the number of elements in the sample, and supx is the supremum of the set of distances. In this example, the statistic takes the largest absolute difference between the two distribution functions across all x values, and, when "1-output of KS test" is greater than a third predetermined threshold, the engine (208) may infer that the columns are similar. Otherwise, the engine (208) may infer that the columns are not similar.

As yet another example, for the "string*string" combination (e.g., when two columns (that forms a column pair) are both classified as string columns), the engine (208) may employ a fourth variation of the first model to calculate the edit distance for all the values (e.g., to infer how close a first value to another related value) and store each edit distance in a list. In this example, when the maximum edit distance over the length of column values is greater than a fourth predetermined threshold, the engine (208) may infer that the columns are similar. Otherwise, the engine (208) may infer that the columns are not similar.

As yet another example, for the "datetime*datetime" combination (e.g., when two columns (that forms a column pair) are both classified as datetime columns), the engine (208) may employ a fifth variation of the first model to define one or more features for each datetime column (e.g., whether a related column is a month start column, whether a related column is a month end column, etc.). In this example, when 90% of the values are in the same month and year, and either belong to "month start" and "month end", the engine (208) may infer that the columns are similar. Otherwise, the engine (208) may infer that the columns are not similar.

In one or more embodiments, by employing the first model and dynamic partitioning, the engine (208) may then identify records (e.g., columns that belong to the same data type, columns that would be precursors to join tables (joinable columns), etc.) that are similar based on each variable's data type and a specific similarity metric(s) (e.g., a specific similarity threshold). In some cases, there may be a lot of tables with multiple columns and the engine (208) may need to spend more time processing all possible column combinations/pairs (e.g., if Table A has 250 columns and Table B has 250 columns, the engine (208) may need to spend hours to compare columns and find similar column pairs).

To overcome this issue, the engine (208) may leverage dynamic partitioning to make the computations (e.g., computations to find similar columns (in terms of data type)) faster. The engine (208) may also leverage dynamic partitioning for not being negatively affected (in terms of processing speed) by tables that have different sizes (for example, it may be possible that the size of Table C is smaller than the size of Table D (e.g., Table C has 100 rows and Table D has 10,000 rows) and this may cause an imbalance in the engine's (208) computations). To this end (e.g., to create a balance between the number of rows), the engine (208) may generate a dynamic partition column for related tables (e.g., during runtime in memory) based on a row number, a table identifier, and a column identifier of each column as an index instead of using a static column as the partition value (said another way, the dynamic partitioning is used based on a row number, a table identifier, and a column identifier of each column). With this way, the engine (208) may ensure the balance between the number rows processed in corresponding tables of a join criterion (e.g., both left and right side of the join criterion, which is an inner join). For example, by employing dynamic partitioning, the engine (208) may ensure that the same set of rows are loaded (for processing) from corresponding tables every time.

The Second Pipeline

In one or more embodiments, after obtaining the similar records (e.g., tables with a set of similar columns (e.g., Table 1 Column 1 is similar with Table 2 Column 2)) as a result of the first pipeline, the engine (208) may generate a join data graph to model join relationships among the tables, in which each table is modeled as a vertex/node and an edge is formed between two tables (in the graph) if they can join (e.g., if there is at least one pair of similar column between the two tables). Said another way, the engine (208) may use a graph-based approach for table joins to provide flexibility, scalability, and efficient querying (e.g., for users/people), especially when dealing with complex relationships among tables.

In one or more embodiments, the engine (208) may model one or more join relationships among the tables as a graph (e.g., a join data graph), which is useful to find/identify one or more join connections among the tables that are not directly related to each other. Thereafter, by employing a second model (e.g., a second model that employs a Bayes optimality under beam search approach, which is an iterative process), the engine (208) may analyze the join data graph (e.g., perform a graph-based beam search, explore the join data graph, etc.) to identify (and maintain) a set of the most promising candidate paths/beams (in the graph) based on each path's score. Each path may be defined from a source node to a target node, which indicates the tables that can be joined together, along with the appropriate columns that can be used to define a join condition. While the engine (208) is employing the beam search approach, the beam size may determine how many paths are kept at each step/iteration.

More specifically, the beam search approach may gradually expand the beam by considering one or more successor nodes or edges from a current set of paths and select the most promising candidate paths based on each path's score. For any testing instance (x, y), in which "x" is the source node and "y" is the target node, let $B_h(x)$ denote a node set at the h-th level retrieved by the beam search approach and $k=|B_h(x)|$ denote the beam size. Accordingly, the beam search approach can be defined as:

$$B_h(x) \in \arg Topk p_g(z_n = 1 | x)$$
$$n \in \tilde{B}_h(x)$$

where $\tilde{B}_h(x) = U_{n' \in B_{h-1}(x)} C(n')$.

In one or more embodiments, the engine (208) may not employ a second model that employs only a beam search approach because this approach may expand parts of nodes with larger scores while pruning other nodes. To this end, the engine (208) may employ a second model that employs a Bayes optimality under beam search approach, which aims to find a candidate node/path/edge that maximizes the expected utility (e.g., to find the best possible successor node from a current node), considering both the current score and potential future scores of each node.

More specifically, while employing the Bayes optimality under beam search approach, the second model (and, indirectly, the engine (208)) may use one or more Bayesian methods to estimate the probabilities (or scores) of different candidates based on available information (e.g., extracted/ obtained from the join data graph). The second model may then use these estimates to rank and select the top candidates to expand the beam search further. Given the beam size "k" and the data distribution "p: X×Y→R+", a tree model M(T, g) may be called the top-k Bayes optimality under beam search if $$\{\pi(n): n \in B_H(x)\} \in \underset{j \in I}{\arg Topk}\, n_j(x)$$

holds for any x∈X. As indicated above, M(T, g) is called the Bayes optimality under beam search if the above equation holds for any x∈X and 1≤k≤M. By incorporating the Bayesian interference (through the Bayes optimality under beam search approach), the engine (208) may make more informed decisions (e.g., determining, based on a set of the most promising candidate paths and a user query, similar columns that can be joined), considering the uncertainty in the information obtained from the join data graph (where having multiple options (e.g., joinable columns) to join tables may create uncertainty).

One of ordinary skill will appreciate that the engine (208) may perform other functionalities without departing from the scope of the embodiments disclosed herein. The engine (208) may be implemented using hardware (e.g., any number of integrated circuits for processing computer readable instructions), software (e.g., a computer program executing on the underlying hardware of the IN (200)), or any combination thereof.

In one or more embodiments, the engine (208) may initiate, for example, displaying of (i) identified/tagged health of a corresponding client (after obtaining telemetry data of the client), (ii) a holistic user profile of a user of the client (e.g., 110A, FIG. 1), (iii) engine generated alerts (to indicate an overall health status of the client), and/or (iv) one or more similar columns (e.g., in a specific order) that can be used in joining related tables to an administrator/user via the visualizer (220) (e.g., via a GUI, an API, a programmatic interface, and/or a communication channel of the visualizer). In one or more embodiments, for example, (i) each data item (e.g., identified health of the client, an engine generated alert, etc.) may be displayed (e.g., highlighted, visually indicated, etc.) with a different color (e.g., red color tones may represent a negative overall health status of the client, green color tones may represent a positive overall health status of the client, etc.), and (ii) one or more useful insights/recommendations with respect to the overall health status of the client may be displayed in a separate window(s) on the visualizer (220) to assist the administrator while managing the overall health status of the client (e.g., for a better administrator experience, to help the administrator with respect to understanding the benefits and trade-offs of selecting different troubleshooting options, etc.).

Further, the visualizer (220) may include functionality to, e.g.: (i) obtain (or receive) data (e.g., any type and/or quantity of input) from any source (e.g., a user via a client (e.g., 110A, FIG. 1), the engine (208), etc.) (and, if necessary, aggregate the data); (ii) based on (i) and by employing a set of linear, non-linear, and/or ML models, analyze, for example, a query to derive additional data; (iii) encompass hardware and/or software components and functionalities provided by the IN (200) to operate as a service over the network (e.g., 130, FIG. 1) so that the visualizer (220) may be used externally; (iv) employ a set of subroutine definitions, protocols, and/or hardware/software components for enabling/facilitating communications between, for example, the engine (208) and external entities (e.g., clients, administrators, etc.); (v) by generating one or more visual elements, allow an administrator to, at least, interact with a user of a corresponding client; (vi) receive a customer/user profile of a customer and display the customer profile to an administrator (e.g., for monitoring and/or performance evaluation); (vii) concurrently display one or more separate windows, for example, on its GUI; and/or (viii) generate visualizations of the method illustrated in FIGS. 4.1-4.2.

One of ordinary skill will appreciate that the visualizer (220) may perform other functionalities without departing from the scope of the embodiments disclosed herein. The visualizer (220) may be implemented using hardware, software, or any combination thereof.

In one or more embodiments, the engine (208) and the visualizer (220) may be utilized in isolation and/or in combination to provide the aforementioned functionalities. These functionalities may be invoked using any communication model including, for example, message passing, state sharing, memory sharing, etc.

Turning now to FIG. 3, FIG. 3 shows an example use case in accordance with one or more embodiments disclosed herein. The example, illustrated in FIG. 3 and described below, is explanatory purposes only and not intended to limit the scope disclosed herein.

Referring to FIG. 3, the engine (e.g., 208, FIG. 2) converts the similarity join pairs into a network (e.g., generates a join data graph of all the connections among related tables), where nodes represent the table names (e.g., Historical_ST-Dev, Biz_Rep_Payout, Corp_calendar, Mappings_SS, etc.) and two nodes are connected by an edge if they have a similar column. More specifically, based on a user query (e.g., Step 400 of FIG. 4.1) and by employing the above discussed beam search approach (refer to FIG. 2), the engine (e.g., 208, FIG. 2) leverages the graph/network and predicts a specific sequence/order of similar columns (that can be used in joining related tables).

As indicated, Column 1 is a column of Table 1 and Column 2 is a column of Table 2, in which, while the column identifiers of Column 1 and Column 2 are different, the engine (e.g., 208, FIG. 2), based on the graph and the second model, may determine that Column 1 and Column 2 are similar (e.g., based on their values/properties). Further, based on their similarity to each other, the engine may determine Column 1 and Column 2 as joinable columns in a specific order (if Table 1 and Table 2 needs to be joined, in response to a user query).

FIGS. 4.1-4.2 show a method for managing data in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 4.1, the method shown in FIG. 4.1 may be executed by, for example, the above-discussed the engine (e.g., 208, FIG. 2) and the visualizer (e.g., 220, FIG. 2). Other components of the system (100) illustrated in FIG. 1 may also execute all or part of the method shown in FIG. 4.1 without departing from the scope of the embodiments disclosed herein.

In Step 400, the engine receives, via the visualizer, a request (e.g., an SQL query) from an entity (e.g., a user of/via a client (e.g., 110A, FIG. 1), a web application that is being used by the user, an application terminal of an IN (e.g., 200, FIG. 2) that is being used by an administrator, etc.). In one or more embodiments, the request may specify, for example (but not limited to): an identifier of a user, details of a product order received from the user, identifier of tables and a column join condition that need to be considered while replying to the request (e.g., for a better user/customer experience), etc.

In Step 402, upon receiving the request in Step 400, the engine obtains a set of tables from a database (e.g., 135, FIG. 1). In one or more embodiments, before obtaining the set of tables, the engine may invoke the database to communicate with the database. After receiving the database's confirmation, the engine may obtain the set of tables from the database. The set of tables may be obtained continuously or at regular intervals (e.g., every two minutes) (without affecting production workloads of the database and the engine). Further, the set of tables may be access-protected for the transmission from, for example, the database to the engine, e.g., using encryption.

In one or more embodiments, the set of tables may be obtained as they become available or by the engine polling the database (via one or more API calls) for newer information. For example, based on receiving an API call from the engine, the database may allow the engine to obtain newer information.

In Step 404, by employing the first model (a novel, dynamic, and robust data type classification model, discussed above in reference to FIG. 2), the engine analyzes each variable (e.g., a column and values listed under each column) of each table of the set of tables (obtained in Step 402). In Step 406, based on the analyzing performed in Step 404, the engine classifies/categorizes each variable's data type (or classifies each record (across the set of tables) into a particular data type) (e.g., a categorical column, a numeric column, etc.). Details of the classification are discussed above in reference to FIG. 2.

In Step 408, by employing the first model and dynamic partitioning (discussed above in reference to FIG. 2), the engine identifies records (e.g., columns that belong to the same data type, columns that would be precursors to join tables, joinable tables, etc.) that are similar based on each variable's data type and a metric(s) (e.g., thresholds, discussed above in reference to FIG. 2). In one or more embodiments, to handle multiple join combinations, the engine may perform dynamic partitioning to avoid possible table skews during a table join process (where, instead of considering a static column value as the partition value, the engine performs dynamic partitioning to ensure the balance of rows during a table join process).

In Step 410, based on the similar records (e.g., tables with a set of similar columns (or column similarities), identified by the first model (e.g., a matching model)), the engine generates a join data graph to model join relationships among the tables, in which each table is modeled as a vertex/node (in the graph) and an edge is formed between two tables (of the set of tables) if they can join.

Turning now to FIG. 4.2, the method shown in FIG. 4.2 may be executed by, for example, the engine and the visualizer. Other components of the system (100) illustrated in FIG. 1 may also execute all or part of the method shown in FIG. 4.2 without departing from the scope of the embodiments disclosed herein.

In Step 412, by employing the second model (discussed above in reference to FIG. 2), the engine analyzes the join data graph to identify a set of the most promising/optimal candidate paths in the graph based on each path's score. In one or more embodiments, the engine may handle complex joins (that involve multiple tables and/or require searching through the graph) by leveraging the second model (e.g., a probabilistic model considering current and future scores of candidate nodes of the graph) that employs a Bayes optimality under beam search approach (through the usage of probability distributions over the graph generated by the first model) to learn, at least, column similarities that are Bayes optimal under beam search.

In Step 414, based on the set of the most promising candidate paths and the query/request (e.g., the join condition) (received in Step 400 of FIG. 4.1), the engine determines (i) similar columns (and their associated tables) that can be joined (e.g., joinable columns, where their column identifiers may not be the same, but their variables (e.g., values listed under each column) are similar) and (ii) in what order these columns should be joined (e.g., Column 1 of Table 1 and Column 2 of Table 2 should be joined first (as column pairs) before joining Column 3 of Table 3 and Column 5 of Table 5 (as column pairs)) to process the request (e.g., to generate/construct a proper response the request).

In Step 416, based on Step 414 and in response to the request (received in Step 400 of FIG. 4.1), the engine initiates, via a GUI (e.g., of the visualizer), displaying of the similar/joinable columns (and the corresponding tables) that can be used in joining the tables (of the set of tables) to the user/administrator (e.g., in a specific order/sequence, determined in Step 414), to indicate that the user is able to join a first table of the tables to a second table of the tables based on the joinable columns. In one or more embodiments, the method may end following Step 416.

Turning now to FIG. 5, FIG. 5 shows a diagram of a computing device in accordance with one or more embodiments disclosed herein.

In one or more embodiments disclosed herein, the computing device (500) may include one or more computer processors (502), non-persistent storage (504) (e.g., volatile memory, such as RAM, cache memory), persistent storage (506) (e.g., a non-transitory computer readable medium, a hard disk, an optical drive such as a CD drive or a DVD drive, a Flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) (502) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (e.g., a LAN, a WAN, Internet, mobile network, etc.) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data, the method comprising:
   receiving a request from a user via a computing device;
   obtaining, upon receiving the request, a set of tables from a database,
      wherein the computing device and the database are connected to each other over a network;
   analyzing each variable of each table of the set of tables,
      wherein a variable corresponds to values listed under a column of a table of the set of tables;
   classifying, based on the analyzing, each variable's data type;
   identifying, using a first model and dynamic partitioning, a set of columns that is similar based on each variable's data type and a metric;
   generating, based on a second set of tables comprising the set of columns, a join data graph to model join relationships among the second set of tables,
   wherein each table of the second set of tables is modeled as a node in the graph;
   analyzing, using a second model, the graph to identify a set of candidate paths based on each path's score;
   determining, based on the set of candidate paths and the request, a third set of tables and joinable columns associated with the third set of tables; and
   initiating, using a graphical user interface, display of the joinable columns and the third set of tables to the user in a particular sequence to indicate that the user is able to join a first table of the third set of tables to a second table of the third set of tables based on the joinable columns.

2. The method of claim 1, wherein, when 90% of the values of the column have the same length and a number of unique value lengths in the column is limited, a data type of the column is classified as an identifier column.

3. The method of claim 1, wherein, when the values of the column are not quantitative and a number of distinct values in the column is limited, a data type of the column is classified as a categorical column.

4. The method of claim 1, wherein, when the values of the column are quantitative and are not character representations, a data type of the column is classified as a numeric column.

5. The method of claim 1, wherein, when 90% of the values of the column are character representations and a number of unique value lengths in the column is not limited, a data type of the column is classified as a string column.

6. The method of claim 1, wherein, when the values of the column specify date or time information, a data type of the column is classified as a datetime column.

7. The method of claim 1, wherein the first model analyzes each pair of same data type columns based on a different metric to identify the set of columns.

8. The method of claim 1, wherein an edge is formed between two tables in the graph when there is at least a pair of similar columns between the two tables.

9. The method of claim 1, wherein the dynamic partitioning is used based on a row number, a table identifier, and a column identifier of each of the set of columns.

10. The method of claim 1, wherein the second model employs a Bayes optimality under beam search approach.

11. A non-transitory computer readable medium comprising computer readable program code, which when executed by a computer processor enables the computer processor to perform a method for managing data, the method comprising:
    receiving a request from a user via a computing device;
    obtaining, upon receiving the request, a set of tables from a database,
       wherein the computing device and the database are connected to each other over a network;
    analyzing each variable of each table of the set of tables,
       wherein a variable corresponds to values listed under a column of a table of the set of tables;
    classifying, based on the analyzing, each variable's data type;
    identifying, using a first model and dynamic partitioning, a set of columns that is similar based on each variable's data type and a metric;
    generating, based on a second set of tables comprising the set of columns, a join data graph to model join relationships among the second set of tables,
    wherein each table of the second set of tables is modeled as a node in the graph;
    analyzing, using a second model, the graph to identify a set of candidate paths based on each path's score;
    determining, based on the set of candidate paths and the request, a third set of tables and joinable columns associated with the third set of tables; and
    initiating, using a graphical user interface, display of the joinable columns and the third set of tables to the user in a particular sequence to indicate that the user is able to join a first table of the third set of tables to a second table of the third set of tables based on the joinable columns.

12. The non-transitory computer readable medium of claim 11, wherein, when 90% of the values of the column have the same length and a number of unique value lengths in the column is limited, a data type of the column is classified as an identifier column.

13. The non-transitory computer readable medium of claim 11, wherein, when the values of the column are not quantitative and a number of distinct values in the column is limited, a data type of the column is classified as a categorical column.

14. The non-transitory computer readable medium of claim 11, wherein, when the values of the column are quantitative and are not character representations, a data type of the column is classified as a numeric column.

15. The non-transitory computer readable medium of claim 11, wherein, when 90% of the values of the column are character representations and a number of unique value lengths in the column is not limited, a data type of the column is classified as a string column.

16. The non-transitory computer readable medium of claim 11, wherein the first model analyzes each pair of same data type columns based on a different metric to identify the set of columns.

17. The non-transitory computer readable medium of claim 11, wherein the dynamic partitioning is used based on a row number, a table identifier, and a column identifier of each of the set of columns.

18. The non-transitory computer readable medium of claim 11, wherein the second model employs a Bayes optimality under beam search approach.

19. A system for managing data, the system comprising:
a processor comprising circuitry;
memory comprising instructions, which when executed perform a method, the method comprising:
receiving a request from a user via a computing device;
obtaining, upon receiving the request, a set of tables from a database,
wherein the computing device and the database are connected to each other over a network;
analyzing each variable of each table of the set of tables,
wherein a variable corresponds to values listed under a column of a table of the set of tables;
classifying, based on the analyzing, each variable's data type;
identifying, using a first model and dynamic partitioning, a set of columns that is similar based on each variable's data type and a metric;
generating, based on a second set of tables comprising the set of columns, a join data graph to model join relationships among the second set of tables,
wherein each table of the second set of tables is modeled as a node in the graph;
analyzing, using a second model, the graph to identify a set of candidate paths based on each path's score;
determining, based on the set of candidate paths and the request, a third set of tables and joinable columns associated with the third set of tables; and
initiating, using a graphical user interface, display of the joinable columns and the third set of tables to the user in a particular sequence to indicate that the user is able to join a first table of the third set of tables to a second table of the third set of tables based on the joinable columns.

20. The system of claim 19, wherein, when 90% of the values of the column have the same length and a number of unique value lengths in the column is limited, a data type of the column is classified as an identifier column.

* * * * *